United States Patent Office 3,629,363
Patented Dec. 21, 1971

1

3,629,363
STABILIZED CHLOROSULFONATED
POLYETHYLENE
Ernest John Breda, Beaumont, Tex., assignor to E. I. du
Pont de Nemours and Company, Wilmington, Del.
No Drawing. Filed July 16, 1969, Ser. No. 842,350
Int. Cl. C08d 11/04
U.S. Cl. 260—837 R                              3 Claims

ABSTRACT OF THE DISCLOSURE

A process for stabilizing chlorosulfonated polyethylene against heat degradation by incorporating therein 0.1–1.5 parts by weight of an epoxy compound, 0.1–1.5 parts by weight of a barium, strontium, calcium, or lead (II) salt, and 0.01–0.5 part of a rubber antioxidant. A heat stabilizing agent for chlorosulfonated polyethylene.

BACKGROUND OF THE INVENTION

This invention relates to the heat stabilization of elastomeric chlorosulfonated polyethylene.

Chlorosulfonated polyethylene is made by a reaction of a polyethylene solution in carbon tetrachloride with either sulfur dioxide and chlorine or sulfuryl chloride and chlorine. The product has either chlorine atoms or —$SO_2Cl$ groups attached to some polyethylene carbon atoms. Chlorosulfonated polyethylene is recovered by passing concentrated solution through a pair of drying rollers heated to 100–200° C. and removing with a doctor blade the elastomer sheet formed on each roller. During this recovery step, it is impossible to avoid overheating of elastomer particles accidentally held up for extended periods within the drying zone. Such overheated and dark particles (globs) eventually break loose from their temporary resting places and become imbedded in the dried sheet, forming discolored and mechanically weak areas. The contaminated, dry, uncured polymer has a poor bin stability, i.e. it undergoes undesirable changes on storage, especially at elevated temperatures. It appears that once deterioration of the elastomer has begun, it is autocatalytic and can become quite extensive with time.

It is known in the art to stabilize a chlorosulfonated polyethylene elastomer against heat degradation by adding to the solution an epoxy compound prior to the polymer recovery step. A recent patent, U.S. 3,147,315, teaches a process for the heat-stabilization of branched-chain chlorosulfonated polyethylene elastomers with a combination of 0.5–3.0% of a diepoxy compound and 0.1–2% of an ortho-t-alkylphenol. This technique, however, is not equally efficient for the stabilization of linear chlorosulfonated polyethylene elastomers. Furthermore, this and other prior art processes do not provide adequate heat stability for aged chlorosulfonated polyethylene. There is a need for a heat stabilization process which can be used for both linear and branched chlorosulfonated polyethylene elastomers, and which also is effective for aged chlorosulfonated polyethylene.

2

SUMMARY OF THE INVENTION

Now, according to this invention, it has been discovered that both freshly made and aged linear and branched chlorosulfonated polyethylene elastomers are very effectively stabilized against heat degradation by incorporating into an elastomer 0.1–1.5 parts by weight of an epoxy compound per 100 parts of the elastomer; 0.1–1.5 parts of a carbonate, bicarbonate, chloride, or fatty acid salt of barium, strontium, calcium or lead (II); and 0.01–0.5 part of a rubber antioxidant. The maximum total amounts of all three additives is about 3 parts per 100.

DETAILED DESCRIPTION OF THE INVENTION

The three-component system of the present invention has an excellent stabilizing effect at a low concentration level of both the epoxy compound and the antioxidant. A definitive synergistic effect is observed when the present three-component system is used, so that the degree of elastomer stabilization obtained from a given amount of the stabilizer is higher than would be expected by adding the effects of the individual components.

Any chlorosulfonated polyethylene elastomer can be heat-stabilized by the present process. Such elastomers can be either branched or linear and are made from polyethylene having a density before chlorosulfonation of 0.92 to 0.97 and a melt index of about 0.5 to 115. Chlorosulfonated polyethylene elastomers have a density of about 1.10–1.28. These polymers are well known in the art and are available commercially (for example "Hypalon" synthetic rubbers available from Du Pont).

Preferred epoxy compounds are high boiling, nonvolatile liquid resins having an equivalent weight per oxirane group of not more than about 500, a molecular weight of about 200–8000, and a high solubility in carbon tetrachloride. Certain epoxy compounds such as lower glycidyl ethers, are less desirable because of their high volatility. A number of suitable epoxy resins are commercially available under such trade names as Epon or Eponol (Shell Chemical Co.). They are made by condensation of epichlorohydrin and 4,4'-isopropylidenebisphenol. Condensation products of epichlorohydrin with other diphenols, glycols, or glycerine; higher glycidyl ethers, and higher epoxidized oils and esters having oxirane oxygen concentration of at least about 7% also can be used in the present process. Such epoxy compounds include, for example, naphthyl glycidyl ether, chlorophenyl glycidyl ether, 1,4-phenylenebis(glycidyl ether), 1,3-phenylenebis(glycidyl ether), methylenebis(4-phenyl-glycidyl ether), epoxidized soybean oil, and epoxidized unsaturated triglycerides.

Any known rubber antioxidants can be used in the process of this invention; but hindered phenols, bisphenols, and thiobisphenols or alkylated phenol phosphites are particularly suitable. The hindered compounds have a bulky substituent such as a branched alkyl radical, a cycloalkyl radical, or an aryl radical, in at least one orthoposition. They include, for example, 2,6-di-t-butyl-4-methylphenol, 2,6 - di - t - butyl - 4(4' - t - butylphenyl)-phenol, 2,6 - di - t - amyl - 4 - methylphenol, 2,6 - t - octyl - 4 - methylphenol, 2 - t - octyl - 4 - methylphenol, 4,4' - isopropylidenebis(2,6 - di - t - butylphenol), 4,4'-thiobis(6 - t - butyl - 3 - methylphenol), tetrakis[methylene 3 - (3',5' - di - t - butyl - 4' - hydroxyphenyl)propionate]methane and octadecyl 3 - (3,5 - di - t - butyl-4-hydroxyphenyl)propionate. Typical alkylated phenol phosphites are tri(nonylphenyl) phosphite and tri(dinonylphenyl phosphite). All these compounds are commercially available under a variety of trade names.

The epoxy compound usually is added in a carbon tetrachloride solution after the chlorosulfonation reaction has been completed and the reaction mixture degassed. The reaction mass is well agitated during the addition. The antioxidant preferably is added next, also in a carbon tetrachloride solution. Both the epoxy compound and the antioxidant can be added at the same time.

The third component of the stabilizer system is a salt of barium, calcium, strontium or lead (II). In addition to the carbonates, bicarbonates, and chlorides of these metals, their salts with $C_1$–$C_{25}$ fatty acids can be used. Representative of such fatty acid salts are those of butyric acid, caproic acid, capric acid, lauric acid, myristic acid, palmitic acid, stearic acid, methylisopropylacetic acid, arachidic acid, and naphthenic acids.

The third component usually is added as a slurry in water, just before drying the polymer, because the presence of water improves the drying characteristics of chlorosulfonated polyethylene and water is a better dispersing agent for insoluble carbonates. Although certain metal soaps, such as barium oleate or naphthenate, can be added at an earlier stage in a carbon tetrachloride solution, this is less practical because of possible undesirable precipitation of impurities in the reactor and an additional cleaning step required.

Chlorosulfonated polyethylene which is stabilized using the process of the present invention does not become discolored when heated for several hours at 150° C. Stabilized chlorosulfonated polyethylene which has been stored for about two months at ambient temperature also shows a remarkable resistance to heat.

The invention is illustrated by the following examples in which all parts, proportions and percentages are by weight unless indicated otherwise.

MATERIALS

(I) Chlorosulfonated polyethylene

Type A: A chlorosulfonated polyethylene having a combined chlorine content of 34.5% and a combined sulfur content of 1%, made by addition of sulfuryl chloride and chlorine to a carbon tetrachloride solution of a linear polyethylene having a melt index of 5.8 (as determined by ASTM D 1238) and a density of about 0.96.

Type B: A chlorosulfonated polyethylene having a combined chlorine content of 28.4% and a combined sulfur content of 1.3%, made by the addition of sulfuryl chloride and chlorine to a carbon tetrachloride solution of a branched polyethylene having a melt index of about 10 and a density of about 0.92.

(II) Other additives

Epoxy compound: A condensation product of two moles of epichlorohydrin and one mole of 4,4'-isopropylidenebisphenol having a molecular weight of approximately 380.

Antioxidant C: 2,6-di-t-butyl-4-methylphenol. This is added as a 10% carbon tetrachloride solution.

Antioxidant D: A commercial stabilizer for polyvinyl chloride, known to be a mixture of barium and cadmium salts of an organic acid. It is added as a 10% chloroform solution.

Antioxidant E: 4,4'-thiobis(6-t-butyl-3-methylphenol). This is added as a 5% solution in chloroform.

Antioxidant F: 2,6 - di - t - butyl-4(4'-t-butylphenyl)-phenol. This is added as a 10% carbon tetrachloride solution.

Antioxidant G: Tri(mono- and di-nonylphenyl) phosphite, a rubber antioxidant sold commercially as "Polygard" (Uniroyal). This is added as a 10% carbon tetrachloride solution.

EXAMPLES 1–20

General procedure

A plant carbon tetrachloride solution containing 1000 grams of chlorosulfonated polyethylene (Type A or Type B as indicated in Table I) in a two-gallon ceramic vessel is degassed and stirred at about 80–100 r.p.m. with a spiral ribbon agitator. Additives are incorporated, one at a time, with two to ten minutes stirring between additions to insure good blending after each addition. Epoxy compound (if added) is added first as a carbon tetrachloride solution of 25% concentration by weight. An antioxidant (as shown in Table I) is added next and finally the metal salt, which is added as a thin slurry of finely divided salt with about 150 ml. of water, formed by stirring for one to two minutes with a Waring Blendor. A well dispersed slurry is essential for optimum effect. Mixing of the water slurry with the carbon tetrachloride solution of polymer results in an unstable emulsion, which is fed to the nip of a double roll drum dryer heated with steam at 6.8 atm. to isolate the polymer. Thermal stability of the isolated polymer is tested by heating 1–5 gram pieces of polymer at 150° C. in a forced air laboratory oven. Table I gives the type of chlorosulfonated polyethylene tested and the additives used. Table II gives the extent of discoloration after exposure at 150° C. for various periods of time. Color change is determined by visual observation.

TABLE I.—FORMULATION

Parts per 100 parts chlorosulfonated polyethylene

| Example No. | Polymer type | Epoxy comp. | Antioxidant C | Barium carbonate | Other additives | Other antioxidants |
|---|---|---|---|---|---|---|
| 1 | B | | | | | |
| 2 | B | 1.5 | | | | |
| 3 | B | 0.5 | 0.1 | 0.5 | | |
| 4 | A | | | | | |
| 5 | A | 0.5 | | | | |
| 6 | A | 1.5 | | | | |
| 7 | A | | | 0.9 | | |
| 8 | A | | 0.1 | | | |
| 9 | A | 1.5 | 0.1 | | | |
| 10 | A | | 0.1 | 0.9 | | |
| 11 | A | 0.5 | | 0.9 | | |
| 12 | A | 0.5 | 0.1 | 0.9 | | |
| 13 | A | 0.1 | 0.01 | 0.1 | | |
| 14 | A | 0.5 | 0.1 | | 0.9 CaCO₃ | |
| 15 | A | 0.5 | 0.1 | | | 0.1 D |
| 16 | A | 0.5 | | 0.5 | | 0.1 E |
| 17 | A | 0.5 | | 0.5 | | 0.1 F |
| 18 | A | 0.5 | | 0.9 | | 0.1 G |
| 19 | A | 0.5 | 0.1 | | 0.67 SrCO₃ | |
| 20 | A | 0.5 | 0.1 | | 1.22 PbCO₃ | |

TABLE II.—COLOR RATING, AFTER EXPOSURE AT 150° C. FOR TIME SPECIFIED

| Example No. | 1 hr. | 2 hr. | 3 hr. | 4 hr. | 5 hr. | 6 hr. | 7 hr. | 8 hr. |
|---|---|---|---|---|---|---|---|---|
| 1 | 5 | 7 | 7-8 | 8 | | | | |
| 2 | 0-1 | 3 | 4 | 6 | | | | |
| 3 | 0 | 0 | 0 | 1 | | | | |
| 4 | 3 | 4 | 4-5 | 5 | 5 | 6 | 7 | 8 |
| 5 | 1-2 | 3 | 4 | 6 | 7 | 7 | 7 | 7-8 |
| 6 | 1 | 3 | 5 | 6 | 7 | 7 | 7 | 7-8 |
| 7 | 0-1 | 1 | 1 | 1 | 1 | 2 | 2 | 3 |
| 8 | 2 | 3 | 4 | 4 | 4-5 | 5 | 5-6 | 6 |
| 9 | No improvement over 8 | | | | | | | |
| 10 | 0 | 1 | 1 | 1 | 1 | 1-2 | 1-2 | 2 |
| 11 | 0 | 1 | 0-1 | 0-1 | 1 | 1 | 1 | 2 |
| 12 | 0 | 0 | 0 | 0 | 0 | 0 | 0 | 0 |
| 13 | 0 | 1 | 2 | | | 3 | 4 | |
| 14 | 0 | 0 | 0 | 1 | | | | |
| 15 | 0 | 1 | 1 | 2 | | | | |
| 16 | 0 | 0 | 0-1 | | | | | |
| 17 | 0 | 1 | 2 | | | | | |
| 18 | 0 | 0 | 0 | 0 | 0-1 | 0-1 | 0-1 | 1 |
| 19 | 0 | 0-1 | 1 | 1-2 | 2 | 3 | 3 | 4 |
| 20 | 0 | 0-1 | 0-1 | 0-1 | 1 | 1-2 | 2 | 3 |

NOTE.—Explanation of color rating: 0, white, no change; 9, black; 1-8, intermediate colors; increasing numbers correspond to darker colors.

It can be seen from the above tables that in the absence of stabilizers dark color develops, even after one hour exposure to heat at 150° C. (Examples 1 and 4). In the presence of an epoxy compound a slight change in color is observed at the end of one hour, but a definite light color appears at the end of two hours (Examples 2, 5 and 6). In the presence of an antioxidant alone, a light color is produced at the end of one hour (Example 8). In the presence of barium carbonate alone, a slight color formation is noticeable at the end of one hour; this however does not become darker until after about six hours of exposure (Example 7). Combination of an antioxidant and an epoxy compound gives results which are not better than obtained in the presence of the antioxidant alone (Example 9). Combination of an antioxidant with barium carbonate gives results which are substantially identical with those obtained with barium carbonate alone (Example 10, as compared with Example 7). Combination of an epoxy compound with barium carbonate gives results which show certain improvement either over barium carbonate alone, or over a combination of barium carbonate with an antioxidant, but a light color still is observed after an eight hour exposure at 150° C. In the presence of all three ingredients, i.e. an epoxy compound, an antioxidant and barium carbonate, excellent heat stability is observed (Examples 3 and 12). In Example 13, in which all three components are present, but at extremely low concentrations, reasonable heat stability also is obtained. Examples 14 through 20 show results obtained with metal compounds other than barium carbonate and/or antioxidants other than antioxidant C. In all cases, three components are used. Good heat stability is obtained in virtually all cases.

EXAMPLE 21

This example demonstrates the heat stability of raw aged chlorosulfonated polyethylene of Type A. The elastomer is stabilized with three different formulations and stored for two months at a temperature of 23-27° C. and a relative humidity of 60-80%. The results are summarized in Table III, below, which gives data for both freshly made and aged chlorosulfonated polyethylene. Color rating is explained in Table II, above.

TABLE III

| Stabilizer | Months in storage | Color after heating at 150° C. for times indicated | | | |
|---|---|---|---|---|---|
| | | ½ hr. | 1 hr. | 5 hr. | 7 hr. |
| 0.9% BaCO$_3$ | 0 | 0 | 0-1 | 1 | 2 |
| 0.9% BaCO$_3$ | 2 | 0 | 0 | 3-4 | 5 |
| 0.9% BaCO$_3$, 0.1% antioxidant C | 0 | 0 | 0 | 1 | 1-2 |
| 0.9% BaCO$_3$, 0.1% antioxidant C | 2 | 0 | 0-1 | 3 | 3-4 |
| 0.5% epoxy compound, 0.9% BaCO$_3$, 0.1% antioxidant C | 0 | 0 | 0 | 0 | 0 |
| 0.5% epoxy compound, 0.9% BaCO$_3$, 0.1% antioxidant C | 2 | 0 | 0 | 0-1 | 1-2 |

It appears from the above data that barium carbonate alone does not impart good heat stability to aged elastomer, while imparting reasonably good heat stability to freshly made elastomer; that a combination of barium carbonate with an antioxidant still does not well stabilize aged elastomer; and that a combination of barium carbonate with an antioxidant and with an epoxy resin provides excellent heat stability of the freshly made material, while still well protecting aged elastomer.

I claim:

1. A heat-stabilized chlorosulfonated polyethylene having incorporated therein about 0.1–1.5 parts of an epoxy compound having an equivalent weight of no more than about 500, a molecular weight of about 200–8000, and a boiling temperature of at least 200° C. at normal pressure; about 0.1–1.5 parts of a metal compound selected from the group consisting of: barium, calcium, and lead (II), carbonates, bicarbonates, chlorides, and salts of organic acids having 1–25 carbon atoms; and about 0.1 to 0.5 part of a rubber antioxidant selected from the group consisting of hindered phenols and alkylated phenol phosphites; the maximum amount of all three additives being about 3 parts per 100 parts by weight of the chlorosulfonated polyethylene.

2. A heat-stabilized chlorosulfonated polyethylene of claim 1, wherein the epoxy compound is a condensation product of 4,4'-isopropylidenebisphenol with epichlorohydrin; the metal compound is barium carbonate; and the antioxidant is 2,6-di-t-butyl-4-methylphenol.

3. A heat-stabilized chlorosulfonated polyethylene of claim 1, wherein the epoxy compound is a condensation product of 4,4'-isopropylidenebisphenol with epichlorohydrin; the metal compound is barium carbonate; and the antioxidant is 2,6-di-t-butyl-4-(4'-butylphenyl)-phenol.

References Cited

UNITED STATES PATENTS 2,364,410 12/1944 Whittaker _____ 260—45.7 X
3,147,315 9/1964 Ennis et al. _____ 260—837
3,317,436 5/1967 Szczepanek et al. ____ 252—400

DONALD E. CZAJA, Primary Examiner

D. J. BARRACK, Assistant Examiner

U.S. Cl. X.R.

260—23 XA, 45.7 P, 45.7 R, 45.75 R, 45.8 A, 45.85, 45.95, 836